United States Patent
Morishita

(10) Patent No.: US 7,095,853 B2
(45) Date of Patent: Aug. 22, 2006

(54) SYSTEM AND METHOD FOR PREVENTING AN ILLEGAL COPY OF CONTENTS

(75) Inventor: Takuya Morishita, Tokyo (JP)

(73) Assignee: NEC Corporation, (JP)

( * ) Notice: Subject to any disclaimer, the term of this patent is extended or adjusted under 35 U.S.C. 154(b) by 843 days.

(21) Appl. No.: 09/792,194

(22) Filed: Feb. 22, 2001

(65) Prior Publication Data

US 2001/0018743 A1 Aug. 30, 2001

(30) Foreign Application Priority Data

Feb. 24, 2000 (JP) ............................. 2000/047129

(51) Int. Cl.
- H04N 7/167 (2006.01)
- H04L 9/00 (2006.01)
- G06F 11/30 (2006.01)

(52) U.S. Cl. ...................... 380/201; 713/165; 713/167; 713/193; 380/228

(58) Field of Classification Search ................ 380/201; 705/57; 713/200, 201
See application file for complete search history.

(56) References Cited

U.S. PATENT DOCUMENTS

| 5,546,461 A * | 8/1996 | Ibaraki et al. ............... 380/217 |
| 5,608,396 A * | 3/1997 | Cheng et al. .................. 341/50 |
| 5,933,499 A * | 8/1999 | Enari .......................... 380/217 |
| 6,175,639 B1 * | 1/2001 | Satoh et al. ................. 382/100 |
| 6,363,209 B1 * | 3/2002 | Sako et al. .................... 386/94 |
| 6,496,898 B1 * | 12/2002 | Tsutsui ....................... 711/112 |
| 6,643,382 B1 * | 11/2003 | Maeda ........................ 382/100 |
| 6,691,228 B1 * | 2/2004 | Sako et al. ................. 713/193 |

FOREIGN PATENT DOCUMENTS

| JP | 6-231536 | 8/1994 |
| JP | 7-271865 | 10/1995 |
| JP | 8-286840 | 11/1996 |
| JP | 9-128900 | 5/1997 |
| JP | 9-326166 | 12/1997 |
| JP | 10-164511 | 6/1998 |
| JP | 10-290312 | 10/1998 |
| JP | 11-250572 | 9/1999 |
| JP | 11-259973 | 9/1999 |
| JP | 2000-32406 | 1/2000 |

OTHER PUBLICATIONS

Japanese Office Action dated Aug. 27, 2003 (w/ English translation of relevant portion).

* cited by examiner

Primary Examiner—Kambiz Zand
(74) Attorney, Agent, or Firm—Dickstein, Shapiro, Morin & Oshinsky, LLP.

(57) ABSTRACT

The method of preventing illegal copy of contents encrypts a header using a key generated from the previous sector, performs variable-length coding to the encrypted header to shorten its length, and stores the decoded header into the recording medium as well as contents data, in encryption phase. The method, in decryption phase, reproduces the contents data which have different length for each sector by decoding and encoding the header.

11 Claims, 5 Drawing Sheets

SYSTEM AND METHOD FOR PREVENTING AN ILLEGAL COPY OF CONTENTS

BACKGROUND OF THE INVENTION

1. Field of the Invention

The invention relates to a system and a method for preventing an illegal copy of contents (including audio and video data, such as moving images) stored in a recording medium like an optical disk. In particular, the invention relates to a recording medium which stores the contents by the use of the system and the method.

2. Description of the Related Art

Various recording mediums and methods have been proposed which can serve to prevent an illegal copy. For example, disclosure is made in Japanese Laid Open Publication No. Hei 11-250572 (namely, 250572/1999) about an optical disk and a recording method.

According to the disclosed method, it is possible to prevent an illegal copy by using a specific media ID of an original optical disk when contents stored in the original optical disk are decoded. That is, even if contents stored in the original optical disk are illegally copied onto another copy optical disk, decoding of the copied contents is properly prevented. This is because, when the contents are illegally copied onto another copy optical disk, a copied media ID on another optical disk is different from or changed from the media ID of the original optical disk.

However, in the conventional method, once the contents (for example, audio and video data) are decoded (decrypted), the can be easily reproduced without any restriction. Therefore, if the decoded contents are obtained by some means, the contents can be illegally copied to another optical disk or another recording medium in the same aspect as the original contents.

SUMMARY OF THE INVENTION

It is, therefore, an object of the invention to provide a method which is capable of preventing an illegal copy of encrypted contents, such as moving images, by making it difficult to reproduce the contents. More specifically, even if the contents are decrypted and the decrypted contents are illegally copied in the same aspect as the decrypted contents to another optical disk or another recording medium, such decrypted contents can not be reproduced.

Furthermore, it is an object of the invention to provide a system and a recording medium to which the method according to the invention is applied.

According to a first aspect of the invention, there is provided a method of preventing illegal copy of contents stored in each sector of a fixed-length. Each sector includes a header and contents data and the method comprises the steps of encrypting at least a part of data to be stored as encrypted data in the sector, using a key generated based on data other than the data stored in the sector, and variable-length coding at least a part of the encrypted data and storing the coded data into the recording medium.

Thereby, even if decrypted or unprotected contents, such as audio and video data, flow out, the prevention of illegal copy of contents is realized effectively According to a second aspect of the invention, there is provided a recording medium readable by a computer, including sectors each of which comprises a header and contents data. Herein, at least a part of data stored in the sector is encrypted using a key generated based on data other than the data stored in the sector, and at least a part of the encrypted data is further variable length coded.

According to a third aspect of the invention, there is provided a system for preventing illegal copy of contents stored in a recording medium in a unit of fixed-length sector, and each sector includes a header and contents data. The system comprises an encryption device and a decryption device. The encryption device includes an encryption key generator which generates an encryption key used to encrypt the header, a header encryption unit which encrypts the header using the encryption key, a variable-length coding unit which performs variable-length coding process to the encrypted header and changes the length of the encrypted header, and a contents data encryption unit which encrypts the contents data On the other hand, the decryption device includes a decryption key generator which generates a decryption key used to decrypt the header, a header decryption unit which decrypts the header using the decryption key, a variable-length decoding unit which performs variable-length decoding process to the decrypted header, and a contents decryption unit which decrypts the contents.

According to a fourth aspect of the invention, there is provided an encryption device for preventing illegal copy of contents stored in a recording medium in a unit of fixed-length sector and each sector includes a header and contents data. The encryption device comprises an encryption key generator which generates an encryption key used to encrypt the header, a header encryption unit which encrypts the header using the encryption key, a variable-length coding unit which performs variable-length coding process to the encrypted header and changes the length of the encrypted header, and a contents data encryption unit which encrypts the contents data.

According to a fifth aspect of the invention, there is provided a decryption device for preventing illegal copy of contents stored in a recording medium in a unit of fixed-length sector, and each sector includes a header and contents data. The decryption device comprises a decryption key generator which generates a decryption key used to decrypt the header, a header decryption unit which decrypts the header using the decryption key, a variable-length decoding unit which performs variable-length decoding process to the decrypted header, and a contents decryption unit which decrypts the contents.

According to a sixth aspect of the invention, there is provided a recording medium readable by a computer tangibly embodying a program of instructions executable by the computer to perform a method of preventing illegal copy of contents stored in a recording medium in a unit of fixed-length sector and each sector includes a header and contents data. The method comprises the steps of encrypting at least a part of data to be stored in the sector, using a key generated based on data other than the data stored in the sector, and variable-length coding at least a part of the encrypted data and storing the coded data into the recording medium.

According to a seventh aspect of the invention, there is provided a computer data signal embodied in a carrier wave and representing a sequence of instructions which, when executed by a processor, cause the processor to perform a method of preventing illegal copy of contents stored in a recording medium in a unit of fixed-length sector and each sector includes a header and contents data. The method comprises the steps of encrypting at least a part of data to be stored in the sector, using a key generated based on data other than the data stored in the sector, and variable-length coding at least a part of the encrypted data and storing the coded data into the recording medium.

According to an eighth aspect of the invention, there is provided a program product comprising, computer readable instructions and a recording medium bearing the computer readable instructions. And the instructions are adaptable to enable a computer to perform a method of preventing illegal copy of contents stored in a recording medium in a unit of fixed-length sector and each sector includes a header and contents data. The method comprises the steps of encrypting at least a part of data to be stored in the sector, using a key generated based on data other than the data stored in the sector, and variable-length coding at least a part of the encrypted data and storing the coded data into the recording medium.

DESCRIPTION OF THE PREFERRED EMBODIMENT

Figure 1:
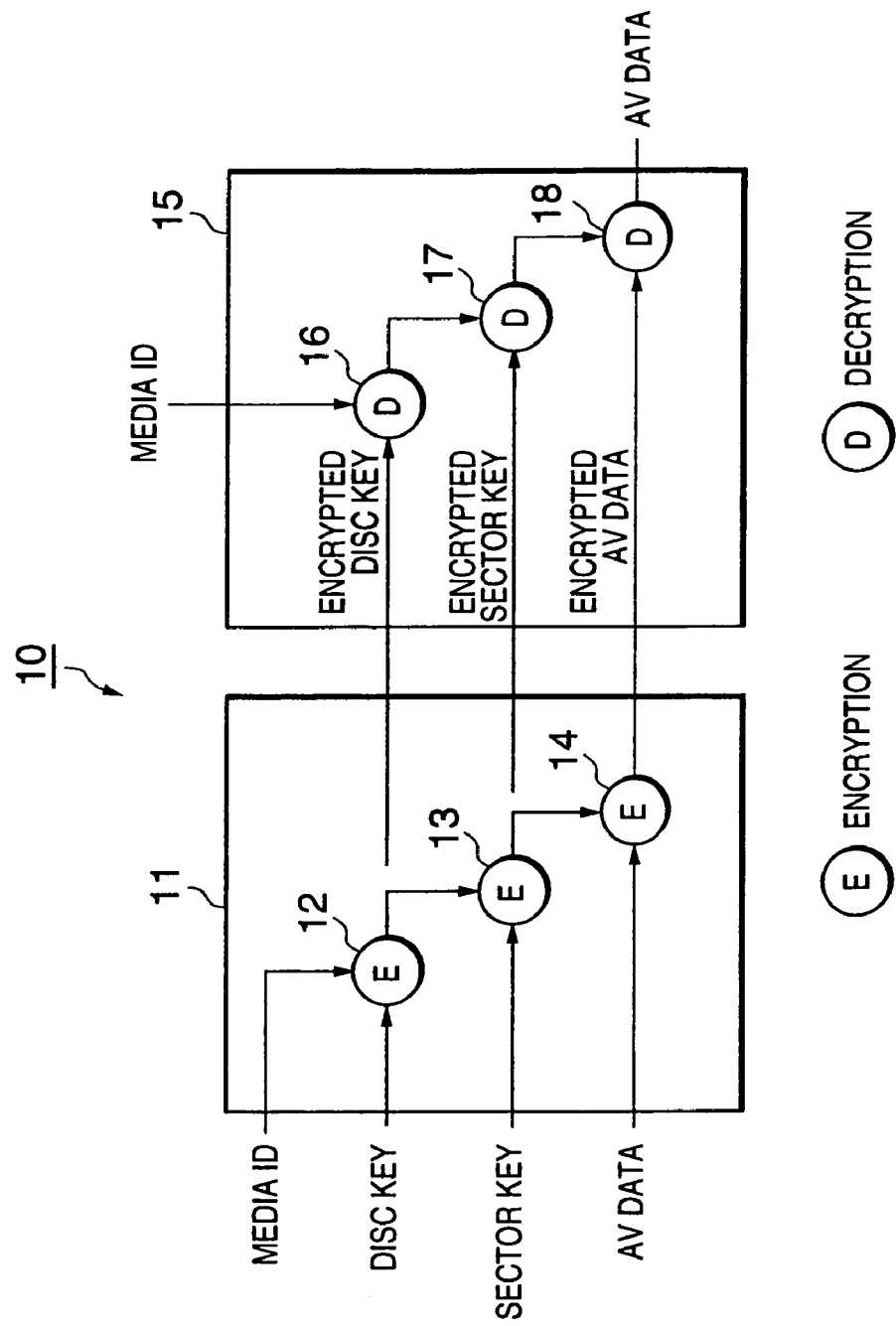
FIG. 1 shows a block diagram of a recording/reproducing device performing a conventional method of preventing an illegal copy.

At first, illustration is made with reference to FIG. 1 about a conventional method which is substantially equivalent to that disclosed in Japanese Laid Open Publication No. Hei. 11-250572 (namely, 250572/1999) referenced in the preamble of the instant specification FIG. 1 shows a configuration of a device for recording/reproducing contents in an optical disk.

The illustrated recording/reproducing device 10 includes a recording unit 11 which encrypts audio and video data (hereinafter, referred to as AV data) and stores the data into an optical disk, and reproducing unit 15 which reads out the AV data from the optical disk and decodes (decrypts) the AV data.

In the recording unit 11, a first encryption circuit 12 encrypts a disk key into an encrypted disc key by using a media ID which is specific to the optical disk storing the AV data.

A second encryption circuit 13 uses the encrypted disc key to encrypt a sector key used to encrypt the AV data for each program.

A third encryption circuit 14 is given the encrypted sector key and the AV data to encrypt the AV data for each program into encrypted AV data by using the encrypted sector key. The encrypted AV data are stored into the optical disk and then both the encrypted disc key and the encrypted sector key are also stored into the optical disk.

As described above, the recording/reproducing device 10 can perform a different encryption process for each optical disk since the media ID is specific to the optical disk and is used in the encryption process.

On the other hand, in the reproducing unit 15, a first decryption circuit 16 decrypts the encrypted disc key by using the specific media ID of the optical disk And a second decryption circuit 17 decrypts the encrypted sector key using the decrypted disc key. Further, a third decryption circuit 18 decrypts the encrypted AV data into the AV data by the use of the decrypted sector key.

However, in the conventional method, once the decrypted AV data can be reproduced into a reproduction of the AV data, it is easy to copy the reproduction of the AV data onto an optical disk or another recording medium.

Figure 2:
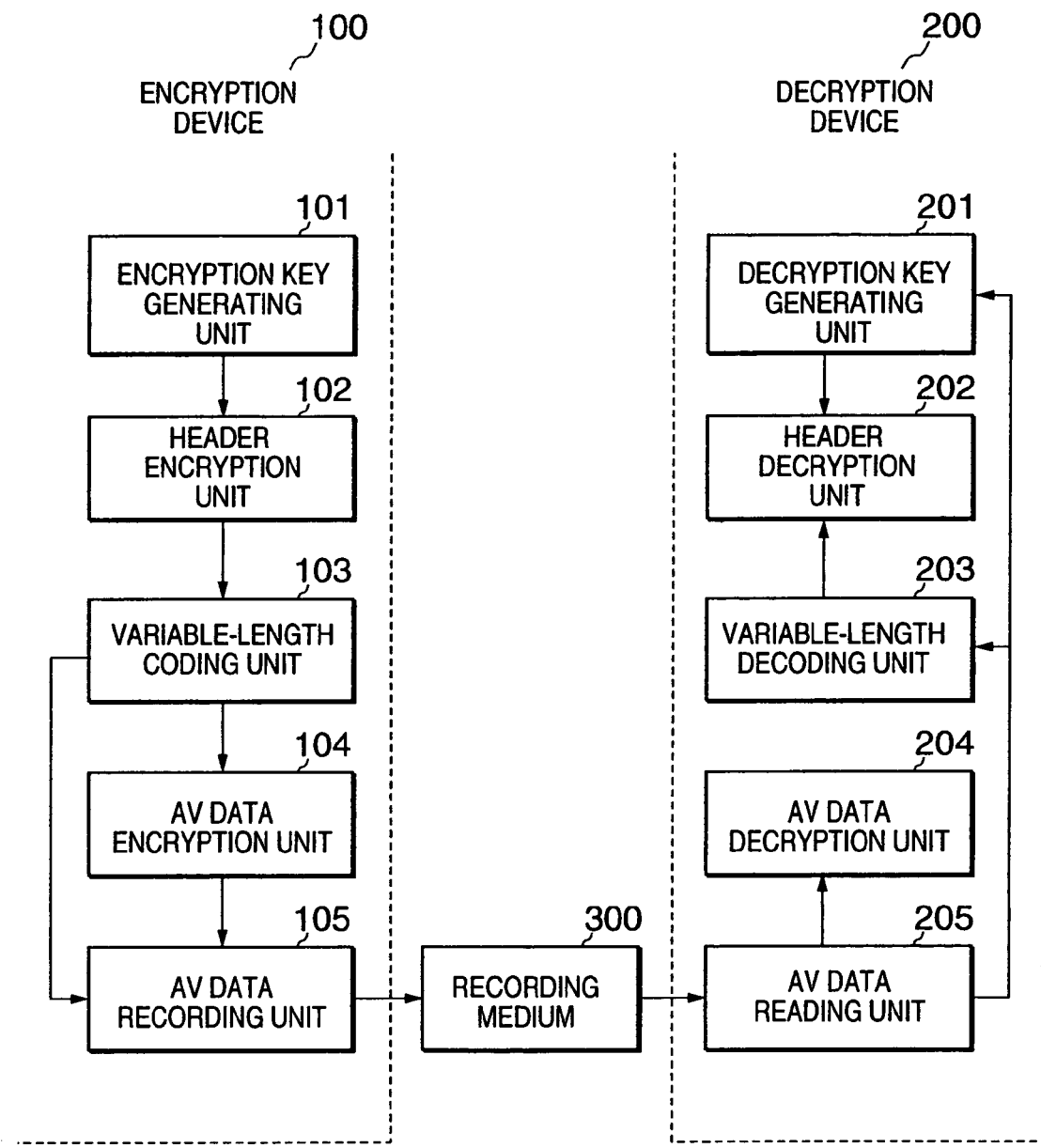
FIG. 2 shows a block diagram of an embodiment of a copy prevention system according to the invention.

Next, description is made with reference to FIG. 2 about a system according to an embodiment of the invention, which is operable to prevent an illegal copy of contents and which will be simply referred to as a prevention system.

The illustrated prevention system includes an encryption device 100, a decryption device 200, and a recording medium 300.

Specifically, the encryption device 100 includes an encryption key generating unit 101, a header encryption unit 102, a variable-length coding unit 103, an AV data encryption unit 104, and an AV data recording unit 105.

On the other hand, the illustrated decryption device 200 includes an decryption key generating unit 201, a header decryption unit 202, a variable-length decoding unit 203, an AV data decryption unit 204, and an AV data reading unit 205.

Also, the AV data are arranged in sectors and stored into a recording medium. Each sector includes a header part and a data part. The AV data are separately stored in the data parts of sectors Hereinafter, the term "sector" is used as a physical recording/reading unit of a recording medium such as a DVD, and also used as a logical record to be stored in the medium or to be read from the medium.

The encryption key generating unit 101 generates an encryption key obtained by using data of the previous sector and which serves to encrypt the header.

The header encryption unit 102 encrypts the header into an encrypted header by using the encryption key generated by the encryption key generating unit 101.

The variable-length coding unit 103 performs variable-length coding operation about the encrypted header which is encrypted by the header encryption unit 102. It is to be noted that the variable-length coding unit 103 is helpful to change the length of the encrypted header.

The AV data encryption unit 104 encrypts the AV data into an encrypted AV data. The AV data recording unit 105 records the variable-length coded header and the encrypted AV data onto the recording medium 300.

The decryption key generating unit 201 generates a decryption key which serves to decrypt the encrypted header by using data of the previous sector.

The header decryption unit 202 decrypts the encrypted header into a decrypted header by the use of the decryption key generated by the decryption key generating unit 201.

The variable-length decoding unit 203 decodes the variable-length coded header into a variable-length decoded header.

The AV data decryption unit 204 decrypts the AV data into decrypted AV data. The AV data reading unit 205 reads the variable-length coded header, the encrypted AV data, and the encryption key of the encrypted AV data from the recording medium 300.

Figure 3:
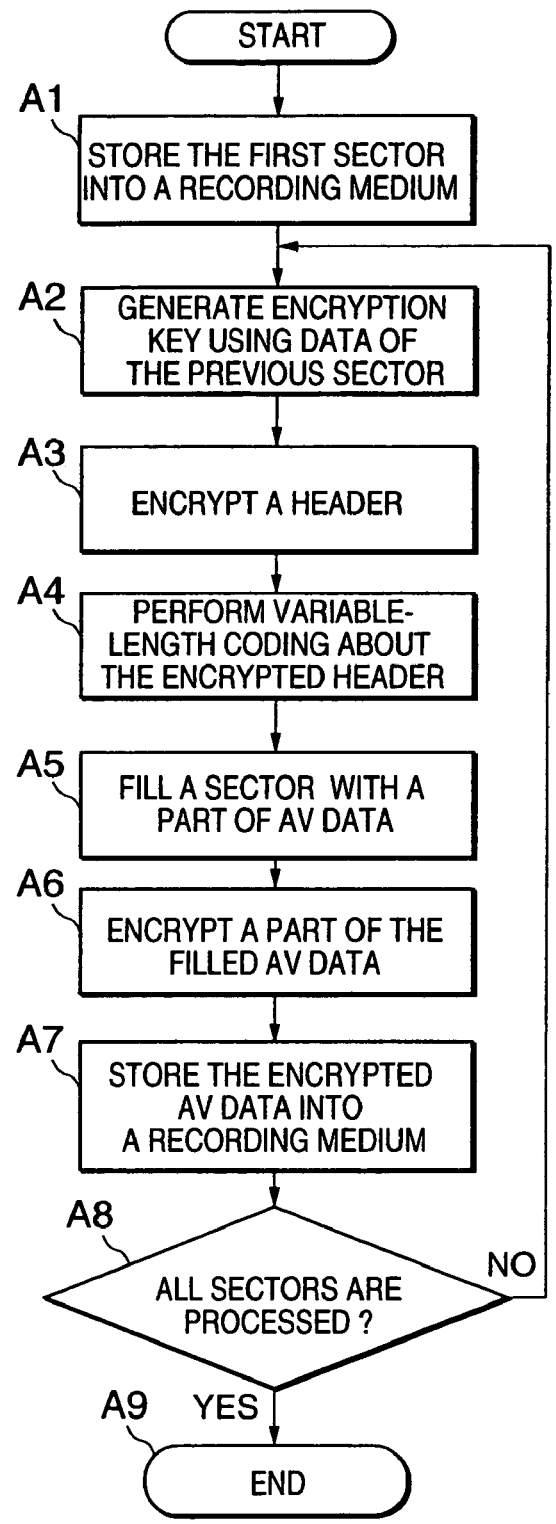
FIG. 3 shows a flowchart representing operations of an encryption unit of the system according to the invention.

Then, description is made about operations of the encryption device 100 according to an encrypting method of the invention in connection with FIG. 3. Also, AV data have been already generated in a predetermined format, such as MPEG 2 (Moving Picture Export Group 2), and description is omitted about the generation process of the AV data since the generation process is not directly concerned with the invention.

At first, the AV data recording unit 105 stores a header and AV data of the first sector, into a recording medium 300 (step A1). Next, the encryption key generating unit 101 generates an encryption key with reference to data of the previous sector (step A2). The encryption key is helpful to encrypt the header. The generation of the key may be done by simply extracting a specific location of the sector, or by performing unidirectional calculation, such as check sum or hashing.

Then, the header encryption unit 102 encrypts the header into an encrypted header by using the encrypted key generated by the encryption key generating unit 101 (step A3). An encryption algorithm used herein may be, for example, an algorithm for a common key system, an algorithm for a public key system, or an original algorithm which is not open to the public.

After that, the variable-length coding unit 103 performs variable length coding operation about the encrypted header which is encrypted by the header encryption unit 102 using, for example, a translation table of variable-length code (step A4). It is desirable to use, as the variable-length coding algorithm, an algorithm which has higher compressing efficiency and can generate shorter codes such as Huffman coding.

The AV data encryption unit 104 fills a sector of a predetermined fixed-length with a part of the AV data (step A5) and encrypts at least one part of the filled AV data (step A6). The encryption key used in the steps A5 and A6 may be determined by a copyright owner of the AV data contents.

The AV data recording unit 105 stores the variable length coded header, the encrypted AV data, and the encryption key into the recording medium 300 as a sector (step A7).

Figure 4:
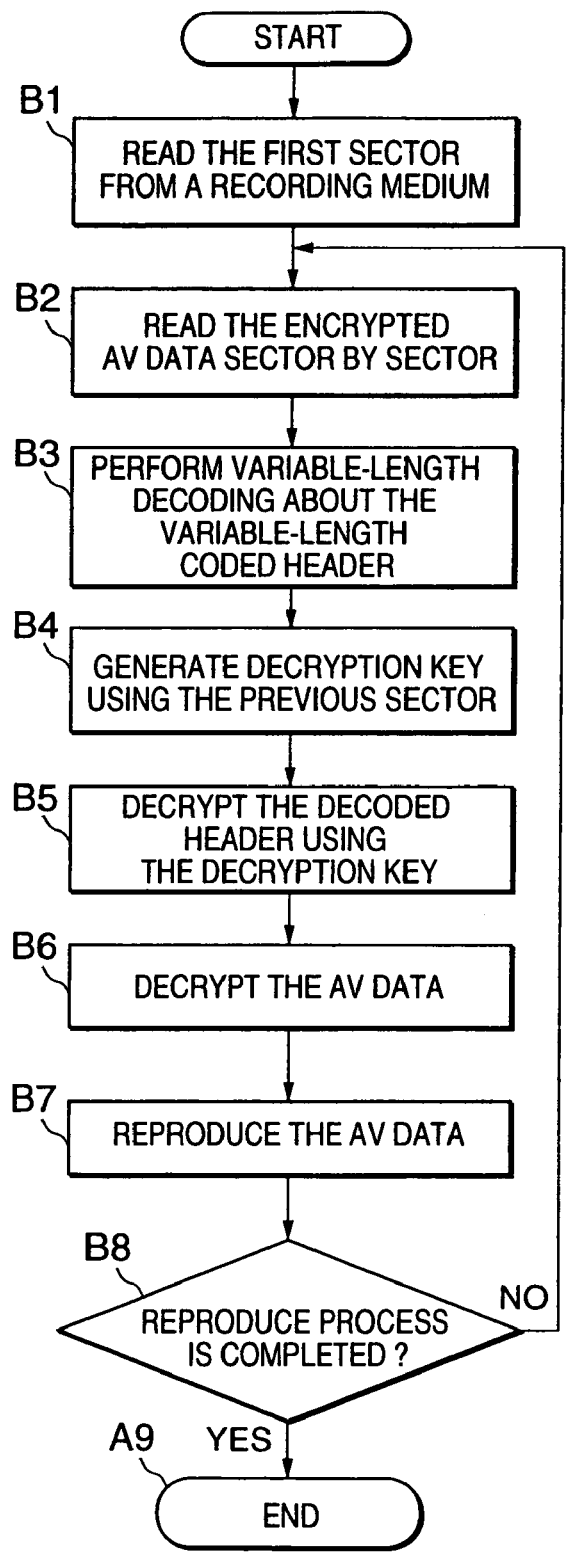
FIG. 4 shows a flowchart representing operations of an decryption unit of the system according to the invention.

Next, description is made in connection with FIG. 4 about operations of the decryption device 200 according to a decrypting method of the invention. Description about the reproduce process of the AV data is also omitted since the process itself has no concern with the invention.

At first, the AV data reading unit 205 reads the encrypted header and the encrypted AV data of the first sector from the recording medium 300 (step B1). Then, it is to be noted that the encrypted AV data are read by the unit 205 at every sector, namely, sector by sector (step B2).

The variable-length decoding unit 203 decodes the variable-length coded header of the sector (step B3) into a decoded header.

The decryption key generating unit 201 generates a decryption key to decrypt the encrypted header using data of the sector previously processed (step B4). The decryption unit 202 decrypts the encrypted header which is decoded by the variable-length decoding unit 203. In this event, the encrypted header is decrypted into a decrypted header by using the encryption key generated by the decryption key generating unit 201 (step B5).

The AV data decryption unit 204 decrypts the encrypted AV data into decrypted AV data (step B6)

Next, by using the decrypted header and the decrypted AV data, the AV data are reproduced (step B7). Operations from step B2 to step B7 are repeated until the reproduce process is completed (step B8).

Figure 5:
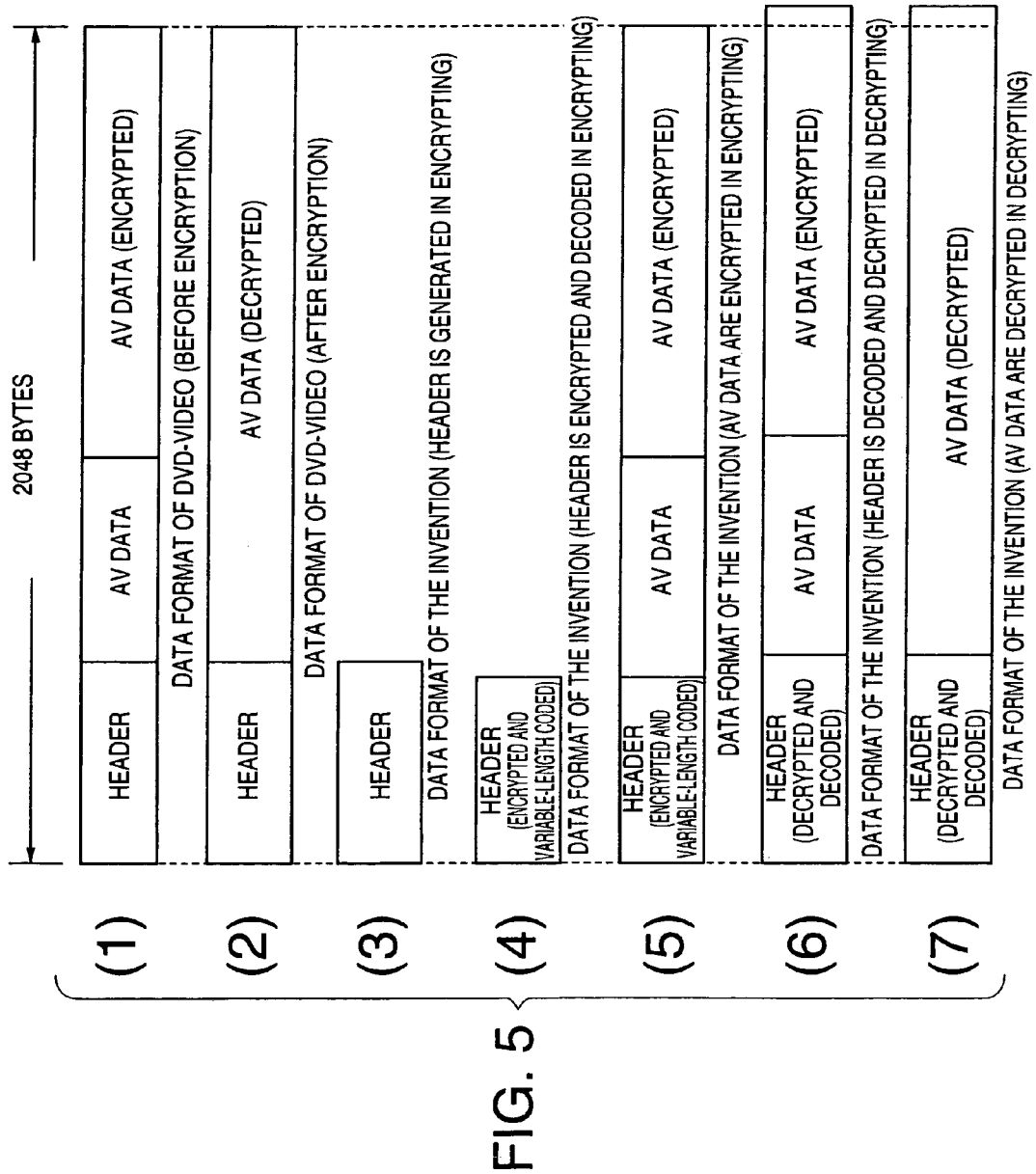
FIG. 5 shows a series of data formats for explaining encryption/decryption processes of the invention.

Then, description is made about encryption/decryption processes of the invention with reference to FIG. 5. Herein, illustration is made in FIG. 5 comparing the processes of the invention with encryption process for data stored in a DVD by the use of a storing method DVD-Video. DVD-Video is known as a regulation for storing the AV data onto a DVD.

It is to be noted that the DVD-Video data are stored in a DVD in a format of moving images which is broadly spread and which is mainly uses MPEG 2 as storing method of the AV data.

In general, it is known that a recording medium used for DVD-Video data, has a plurality of sectors each of which has 2048 bytes. In other words, each sector is 2048 bytes long. In each sector, the AV data and the header are filled. The header includes control information such as synchronization reproduce information between moving images and audio. Specifically, as shown in (1) of FIG. 5, the AV data are partly encrypted and stored to prevent an illegal copy.

Hereinafter, expression "header" or "AV data" without parentheses in FIG. 5 means header or AV data, that are not encrypted, decrypted, coded, and decoded.

On the other hand, for example, expression "AV data (encrypted)" means AV data which are encrypted.

The copy protection method is effective because the method uses a closed encryption algorithm and a key used in decryption process is stored in an area where a general user can not normally access.

When the AV data are reproduced, the AV data are decrypted using the key to generate a 2048 bytes length of sector including a header which is not coded, together with the decrypted data, as shown in (2) of FIG. 5. Therefore, at this point, if the decrypted data are copied to a DVD-RAM, a hard disk, or another recording medium by using some means, it is difficult to prevent reproducing the AV data.

Therefore, in the invention, firstly the header in the sector is encrypted and then, the header is coded using reversible variable length coding process as shown in (3) and (4) of FIG. 5. At this point, the length of the header is generally reduced as shown in (4) of FIG. 5.

Herein, the encryption key used in the encryption of the header is determined, for example, by a part of data in the previous sector of a hash value. Then, AV data are filled in the sector so that the length of the sector becomes 2048, and at least a part of the filled AV data are encrypted as shown in (5) of FIG. 5. Then, the data shown in (5) of FIG. 5 are stored in a recording medium 500 as a 2048 bytes length of sector.

Comparing between data structure shown in (1) of FIG. 5 and the same shown in (5) of FIG. 5, it is understood that they have the same length of 2048 bytes. But, in the data structure according to the invention ((5) of FIG. 5), an amount of AV data which can be included in the sector is greater than that of conventional data structure of DVD-Video ((1) of FIG. 5), since the header is compressed by the variable-length coding process.

When the AV data are reproduced, at first, the variable-length coded header is decoded and decrypted to be restored as an original header, as shown in (6) of FIG. 5. Then, the encrypted AV data are decrypted into decrypted AV data as shown in (7) of FIG. 5.

Now, let comparison be made between data structure shown in (2) of FIG. 5 and data structure shown in (7) of FIG. 5. In this event, even if the decrypted AV data are copied onto another recording medium, it is impossible to reproduce the AV data as DVD-Video data stream since the length of the data structure illustrated in (7) of FIG. 5 is longer than 2048 bytes and is, therefore, different from the length of the sector.

Also, it may be considered that the coded header remains in a header part and only the AV data are decrypted in a data part to make the length of the data part equal to the length of each sector (for example, 2048 bytes). However, even when the AV data and a pair of the coded header and the decrypted AV data are copied to another recording medium, it is impossible to reproduce the AV data, in account of a difference between the lengths of each data part and sector.

Specifically, when the coded header is decoded, the encrypted AV data in the previous sector are necessary, but, in this case, since the AV data in the previous sector have been already decrypted, it is impossible to get a key to decode from the previous sector therefore the coded header can not be decoded. As a result, the AV data can not be reproduced as DVD-Video data, as mentioned above.

As described above, the method of preventing illegal copy according to the invention can prevent normal recording/reproducing of the AV data even if the decrypted AV data are obtained in some routes, since the header in each sector stored in a recording medium is encrypted by a key generated from data including the encrypted AV data in the previous sector, and the encrypted header is further variable-length coded.

Also, in the above mentioned embodiment of the invention, the header is variable-length coded, but if the variable-length coding operation is performed about encrypted data of the AV data rather than the header, similar effect may be expected.

Further, in the above mentioned embodiment of the invention, DVD-Video is used as a recording method, but the method of the invention can be also applied to another type of recording method adopting encryption or to a copy protection system using such the recording medium.

The method of the invention can prevent reproduce of data even if the data are decrypted, since there are some troubles to store the data into another recording medium and to reproduce the data from the middle of the data. The troubles are caused because the data length of a sector when data in the sector encrypted is different from the data length when the data decrypted.

What is claimed is:

1. A method of preventing an illegal copy of contents stored in a recording medium in each sector of a fixed-length, each sector including a header and contents data, comprising the steps of:
    encrypting at least a part of data to be stored as encrypted data in the sector, using a key generated based on data other than the data stored in the sector; and
    variable-length coding only a part of the encrypted data to store the coded data into each sector of the recording medium;
    wherein the decoded variable-length coded data is larger than corresponding coded data.

2. The method of claim 1, wherein the encrypting step and the variable-length coding step are performed for the header.

3. The method of claim 1, wherein the key is a part of the encrypted data in the previous sector or a hash value.

4. A recording medium readable by a computer, including sectors each of which comprises a header and contents data, at least a part of data stored in the sector being encrypted using a key generated based on data other than the data stored in the sector, only a part of the encrypted data being further variable-length coded;
    wherein illegal copying of said sector is prevented;
    wherein the decoded variable-length coded data is larger than corresponding coded data.

5. The recording medium of claim 4, wherein the encrypting and the variable-length coding are performed for the header.

6. The recording medium of claim 4, wherein the key is a part of the encrypted data in the previous sector or a hash value.

7. A system for preventing illegal copy of contents stored in a recording medium in a unit of fixed-length sector, each sector including a header and contents data, comprising an encryption device and a decryption device, wherein the encryption device includes:
    an encryption key generator which generates an encryption key used to encrypt the header;
    a header encryption unit which encrypts the header using the encryption key;
    a variable-length coding unit which performs variable-length coding process to the encrypted header and changes the length of the encrypted header, and
    a contents data encryption unit which encrypts the contents data, and
    the decryption device includes: a decryption key generator which generates a decryption key used to decrypt the header;
    a header decryption unit which decrypts the header using the decryption key;
    a variable-length decoding unit which performs variable-length decoding process to the decrypted header, wherein the decoded and decrypted header is longer than the header; and
    a contents decryption unit which decrypts the contents.

8. An encryption device for preventing illegal copy of contents stored in a recording medium in a unit of fixed-length sector, each sector including a header and contents data, comprising:
    an encryption key generator which generates an encryption key used to encrypt the header;
    a header encryption unit which encrypts the header using the encryption key;
    a variable-length coding unit which performs variable-length coding process to the encrypted header and changes the length of the header; and
    a contents data encryption unit which encrypts the contents data;
    wherein the decoded variable-length coded data is larger than corresponding coded data.

9. A decryption device for preventing illegal copy of contents stored in a recording medium in a unit of fixed-length sector, each sector including an encrypted header and encrypted contents data, comprising:
    a decryption key generator which generates a decryption key used to decrypt the encrypted header;
    a header decryption unit which decrypts the encrypted header using the decryption key;
    a variable-length decoding unit which performs variable-length decoding process to the decrypted header; and
    a contents decryption unit which decrypts the encrypted contents;
    wherein a length of the decoded and decrypted header and decrypted contents is greater than the unit of fixed length sector.

10. A recording medium readable by a computer tangibly embodying a program of instructions executable by the computer to perform a method of preventing illegal copy of contents stored in a recording medium in a unit of fixed-length sector, each sector including a header and contents data, the method comprising the steps of:
    encrypting at least a part of data to be stored in the sector, using a key generated based on data other than the data stored in the sector; and variable-length coding only a part of the encrypted data and storing the coded data into the recording medium;

wherein the decoded variable-length coded data is larger than corresponding coded data.

11. A program product comprising, computer readable instructions and a recording medium bearing the computer readable instructions; the instructions being adaptable to enable a computer to perform a method of preventing illegal copy of contents stored in a recording medium in a unit of fixed-length sector, each sector including a header and contents data, the method comprising the steps of:

encrypting at least a part of data to be stored in the sector, using a key generated based on data other than the data stored in the sector; and variable-length coding only a part of the encrypted data and storing the coded data into the recording medium;

wherein the decoded variable-length coded data is larger than corresponding coded data.

* * * * *